United States Patent [19]

Duplouy et al.

[11] 4,337,032
[45] Jun. 29, 1982

[54] DEVICE FOR MIXING GASEOUS FLUIDS BY TURBULENCE

[75] Inventors: Alain Duplouy, Bievres; Bernard Le Bras, Montelimar, both of France

[73] Assignee: Lafarge Coppee, Paris, France

[21] Appl. No.: 229,252

[22] Filed: Jan. 28, 1981

[30] Foreign Application Priority Data

Jan. 28, 1980 [FR] France ............................. 80 01794

[51] Int. Cl.³ .................... F27B 7/02; F27B 15/00; F23C 5/32
[52] U.S. Cl. ................................ 432/106; 110/264; 366/165;184; 431/173; 432/58
[58] Field of Search ................. 432/106, 58; 366/165, 366/184; 431/173; 110/264

[56] References Cited

U.S. PATENT DOCUMENTS

| | | | |
|---|---|---|---|
| 2,707,444 | 5/1955 | Vanhoon | 110/264 |
| 3,495,949 | 2/1970 | Niedner et al. | 432/58 |
| 4,039,277 | 8/1977 | Kobayashi et al. | 432/58 |

*Primary Examiner*—John J. Camby

*Attorney, Agent, or Firm*—Pollock, Vande Sande & Priddy

[57] ABSTRACT

A device for mixing by turbulence gaseous fluids and solid particles placed in suspension, comprising a mixing chamber into which emerge a first flow of gas introduced through an inlet located at one end of the chamber and forming a vortex which is exhausted through an outlet volute, and a second axial flow introduced through the other end and penetrating along the axis of the vortex in order to mix there with the first flow, the whole being exhausted through the outlet volute. The outlet volute is located in the central portion of the mixing chamber, the latter comprising an upper portion for the formation of the vortex between the outlet volute and the inlet for the vortex flow (A), located at the upper end of it, and a lower portion for recovery and recycling of the solid particles, in the form of a sloping surface which widens upwardly from the inlet orifice for the axial flow (B), located at the lower end of the chamber, as far as the outlet volute.

The invention is especially applicable to installations for the production of cement.

FIG. 1

16 Claims, 7 Drawing Figures

DEVICE FOR MIXING GASEOUS FLUIDS BY TURBULENCE

BACKGROUND OF THE INVENTION

The object of the invention is a device for mixing by turbulence gaseous fluids which contain solid particles in suspension.

The invention is applied more particularly to the calcination of mineral matter in installations for the preparation of cement clinker.

In these installations firing is carried out at high temperature of powdery matter (also called "flour") and consisting generally of a mixture of limestone and clay. The installations for preparation by the dry method include a rotary kiln which serves to roast the flour, and which may be replaced by a fluidized-bed kiln. At the outlet from the kiln the fired flour is cooled by air in a cooler. In compensation, before being introduced into the kiln, the matter undergoes preheating in an installation which consists generally of a series of cyclones in which it circulates in contraflow to hot gases consisting of the flue gases leaving the kiln and/or a device for cooling the matter leaving the kiln.

In general, in the methods of firing silicocalcareous materials, which employ a rotary kiln or one with a fluidized bed and cyclone-type exchangers, it has appeared advantageous in recent years if the greater proportion of the raw material had lost its carbon dioxide before entering the rotary kiln.

That is, it had been realized that the liberation of the carbon dioxide from the slope of the matter in the rotary kiln brought about a destabilization of the flow of the powdery product and a rather irregular arrival of this product in the firing zone of the rotary kiln.

That is why it has appeared well-advised to divide up the application of heat, and to supply between the outlet from the kiln and the exchanger the fuel necessary for the endothermic process of driving off the carbon dioxide. The air necessary for this fuel comes generally from the cooler, either by passing through the kiln or through a duct parallel with the kiln.

This supplementary application of heat is carried out in a system of calcination placed in the circuit of the flue gases between the outlet from the kiln and the lowest cyclone of the preheater.

The powdery product is withdrawn at a temperature of 720° to 780° from the preheater, introduced into the heat-application zone, calcined in this region and then introduced with the flue gases into the bottom cyclone of the exchanger in order to be separated from the flue gases and directed towards the kiln.

It appears that in this type of method the calories produced by the fuel introduced between the outlet from the kiln and the exchanger are employed in an optimal manner if they are absorbed by the endothermic reaction of calcination of the flour between the point of introduction of this flour into the combustion zone and the bottom cyclone of the exchanger, which separates the flour and the flue gases. A less favorable thermal exchange leads to hotter flue gases at the outlet from the bottom cyclone and to a start of calcination in the upper stages of the exchanger.

The temperatures are then raised at all of the stages of the exchanger, and in particular at the outlet of the flue gases from the exchanger, which leads to a lower thermal efficiency of the installation. An effective transfer of the calories applied for the calcination of the flour is therefore necessary for efficient operation of the installation.

The problem has received a first response by a prolongation of the travel of the flour and combustion gases in a very long duct before the cyclone, which may describe loops so as to increase the dwell time necessary to the reaction. Experience shows that it is very difficult in this way to reach lengths which would give the necessary dwell time in this type of flow, and one is led to avoid the loss in efficiency which would result from it in the exchanger by the addition of a supplementary exchanger stage.

But it is known that any increase in height of exchanger towers considerably increases the cost.

Now, the long duration of the dwell times necessary in the solution described above results from the weakness of the turbulence which exists in a duct between the hot gases and the flour.

This has given rise to the idea of intensifying turbulence and by this means speeding up the mixing for homogenization of the flour in the gases and of the temperatures in the gas flows and the heat transfers between gas and flour. Hitherto various systems have been proposed which include mixing chambers intended to intensify the turbulence, in particular by the creation of a vortex flow. The mixing chamber may, for example, have a sidewall of conical shape equipped at its base with an inlet volute and at its upper part with an outlet volute connected to the last cyclone of the preheater. A vortex is produced inside the chamber and a second flow of gas injected along the axis of the outlet volute forms a jet which penetrates inside this vortex in order to be mixed there with the first flow, the whole being discharged through the outlet volute.

Solid matter may be introduced into one or another of the gas flows, and a fuel may likewise be injected into the chamber so as to produce a flame which is mixed with the gases and the matter inside the chamber.

Generally the outlet volute is placed at the upper part of the chamber and the gases forming the vortex are introduced at the lower part by an inlet volute, on the axis of which is placed a cone connected to an exhaust spout in order to recover the solid matter which accumulates by gravity at the time of stoppages or slowing down of the installation. There is a risk of this cone behaving with lower inlet volute as a small cyclone which continually and undesirably collects a portion of the powdery product.

It has likewise been proposed to reverse this device, the inlet volute being placed at the upper part of the chamber and the outlet volute at the lower part. In an embodiment of this type, described, for example, in U.S. Pat. No. 3,098,704, the mixing chamber is associated with a lower chamber into which is introduced air and a fuel which burn in it, the hot gases being exhausted through a flue which penetrates inside the mixing chamber along the axis of the outlet volute.

If solid matter is introduced into such a chamber, there is a risk of the largest fragments, which are not carried along by the flow of gas, accumulating on the bottom wall of the outlet volute round the flue from the combustion chamber.

The object of the invention is an improved device which enables excellent mixing to be carried out by turbulence of two gas flows into which is introduced a solid matter, while assuring the recovery and the recycling of the solid particles which might be deposited at the base of the mixing chamber. In addition, thanks to this recycling, the arrangements enable the dwell time of the solid matter to be prolonged inside the mixing chamber and consequently facilitate the employment of solid fuels having a relatively low calorific power.

SUMMARY OF THE INVENTION

In accordance with the invention, the outlet volute is located in the central portion of the mixing chamber, the latter comprising an upper portion for the formation of the vortex and below the outlet volute a lower portion which widens upwards between the inlet for the axial flow and the outlet volute, for the recovery and recycling into the axial flow of the solid particles which escape from the vortex.

In an application of particular interesting, the mixing device in accordance with the invention consists of a precalcination chamber which, in an installation for the manufacture of cement, is interposed between a device for preheating raw material in suspension and a kiln for clinkerization, the matter coming from the preheater being introduced into at least one of the gas flows which feed the mixing chamber in accordance with the invention, these gases consisting of the hot gases proceeding towards the preheater, the outlet volute emerging into a separation device which comprises an outlet for the matter towards the kiln for clinkerization and an outlet for the gases towards the preheater.

BRIEF DESCRIPTION OF THE DRAWINGS

The invention will now be described by referring to a number of embodiments given by way of examples and represented in the attached drawings.

DETAILED DESCRIPTION OF AN EMBODIMENT

Figure 1:
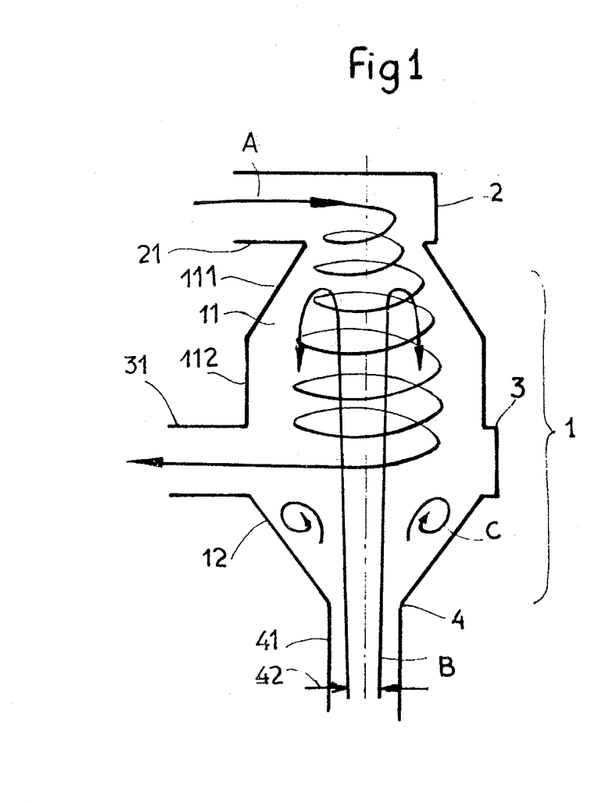
FIG. 1 is a diagrammatic elevation of a first embodiment of the invention.

The device represented in FIG. 1 is composed essentially of a mixing chamber 1 in which is formed a vortex of a flow of gas A introduced through an inlet volute 2 and exhausted through an outlet volute 3. Into the interior of the vortex so formed is introduced a second flow of gas B fed through an inlet orifice 4 located on the axis of the chamber at the end of it opposite from the inlet volute 2.

Hence the mixing chamber 1 is of the type in which the axial flow B penetrates inside the vortex as far as a certain point of reversal where it is mixed with the gas flow A in order to be carried along with it; the turbulence and the exchange of heat is thus increased.

In chambers of this type it is usual to place the inlet volute for the vortex at the lower part of the chamber and the outlet volute at the upper part and to introduce the axial flow B from the top downwards. In the case where the axial flow consists of the hot flue gases leaving a combustion chamber, it has been proposed to reverse this arrangement, the vortex flow being developed from the top downwards. However, when it is desired to introduce solid matter into the chamber, the first arrangement seems more logical since it enables the solid matter to be let fall by gravity along the axis of the outlet volute from the vortex.

In any case, whatever the orientation of the chamber, the inlet and outlet volutes are normally placed at apposite ends.

Hence one aspect in which of the invention differs from prior art structures is the positioning of the outlet volute at a level intermediate between the inlet volute for the vortex flow A and the inlet orifice for the axial flow B, whereas hitherto the outlet volute was located at the level of the inlet for the flow B.

Thus the mixing chamber comprises two portions located respectively above and below the outlet volute 3.

The upper portion 11 of the chamber is located between the inlet volute and the outlet volute. It is there that the vortex is formed from the flow A. Consequently this portion 11 has a shape which is widened from the top downwards and may consist, for example, of a conical surface 111, possibly prolonged by a cylindrical wall 112 as is shown in FIG. 1.

The lower portion 12 of the mixing chamber is located between the outlet volute 3 and the inlet orifice for the axial flow 4, and is bounded by a sloping surface which widens upwards and consists, for example, of a conical or pyramidal wall 12.

One might have expected that the divergent shape of the lower portion 12, would short-circuit the flow of fluid B injected through the bottom orifice 4, causing it to be carried away directly by the outlet volute without rising along the axis of the chamber. However, observation has shown that even for fairly small angles of conicity and for flows and speeds of the same order in the two inlet orifices 2 and 4, the jet of the fluid B rises axially inside the vortex almost as far as the inlet volute 2 before mixing with the fluid A introduced through the volute 2.

This effect may be observed even if the flow B is not injected inside the vortex at a very high speed. In fact, the latter causes a suction effect upon the central flow and it is sufficient that the latter is well channelled by the inlet orifice 4 in order to rise inside the vortex.

The portion 12 thus offers the advantage of recovering the solid particles which are not carried away by the vortex, and returning them inside the chamber 11 by letting them be picked up again by the rising flow B. Moreover, inside the portion 12 round the central jet B scrolls of recirculation C are produced which likewise favor the mixing of the various fluids with the solid matter injected.

Thus the mixing chamber which has just been described assures a very high level of turbulence favorable to an excellent mixing of the fluids, and consequently to an excellent thermal exchange. The result is that the solid matter which may be injected into one of the fluid flows absorbs a considerable amount of heat, and that the calcination of the solid matter may be effected if at least one of the gas flows has been heated by a burner.

In the embodiment shown in FIG. 1, fuel injection means will preferably be placed in the flue 41 opening into the lower orifice 4 so as to produce a diffuse combustion in the rising flow B upstream of the orifice 4. This combustion will be developed in the flow B which covers a longer path in the chamber than the flow A since it must pass through the lower portion 12 and then penetrate inside the vortex before being carried along by the latter.

For this reason the solid matter will likewise be injected preferably into the flow B so as to obtain a dwell time which is as long as possible.

In this case the flow B must obviously consist of a gas which supports combustion, or in any case it must contain excess oxygen, so as to ensure combustion.

Figure 2:
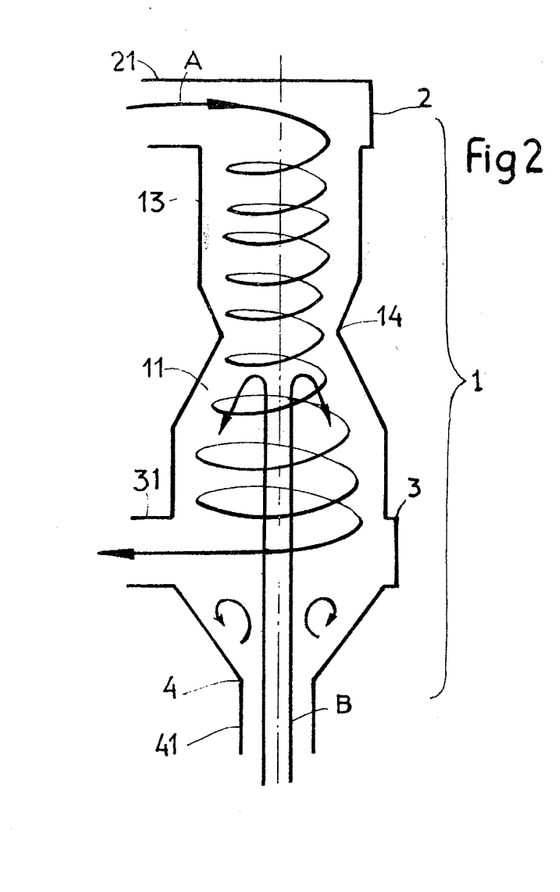
FIG. 2 is an elevation of a second embodiment.

If the gas B does not contain oxygen in excess and if the gas which supports combustion must consist of the flow A arriving through the upper orifice 2, it is then preferable to employ the arrangement represented in FIG. 2.

In this embodiment, the upper portion of the mixing chamber itself consists of two sections. The inlet volute 2 for the flow A opens into the upper portion of a first section 13 consisting of a cylindrical chamber in which the vortex is developed from the top downwards. The section 13 terminates in a contraction 14 which opens into the top of the second section which is formed in a fashion identical with the upper portion 11 of the chamber shown in FIG. 1.

The flow A injected through the flue 21 consists preferably of a gas rich in oxygen, such as hot air. In that way, if a fuel is injected in required proportions into the flue 21, a very hot flame is developed in the vortex formed between the inlet volute 2 and the contracted section 14. This enables the flow of gas B to be confined within the second section 11 and thus to consist of flue gases relatively poor in oxygen without the risk of impeding the development of the flame.

The solid matter is introduced into the flow A and hence undergoes a first increase in temperature in the first section 13.

The vortex continues into the second section 11 as far as the outlet volute 3, and the temperature of the matter increases further in contact with the hot flow B which in the section 11 mixes into the vortex.

Thus, in a relatively small space the association of the two superimposed sections 11 and 13 in which are developed the vortex and the axial introduction of the lower flow B, it becomes possible to achieve both a considerable dwell time of the matter and a rise in temperature sufficient to cause its calcination.

The essential distinction of the mixing chamber just described over prior art derives from its shape, comprising two sections which diverge from two inlet orifices located in the upper and lower partions respectively as far as an outlet volute located in the central portion. This means that the chamber no longer includes transverse plan walls which favor sticking and accumulation of matter close to the outlet volute even when the latter is located at the upper portion of the chamber. Instead of impeding the development of the vortex the lower portion of the chamber, diverging upwardly, collects the solid matter and favors the formation of recirculation currents which further increase the dwell time of the particles in the chamber.

It has been established that the dwell time of solid matter introduced into the chamber may exceed a multiple of the dwell time of the gases because of this recycling through the lower portion 12 of one portion of the vortex flow descending along the cylindrical wall.

This recycling, which essentially affects the heaviest particles of the solid matter introduced into the chamber, facilitates the firing of summarily ground matter by prolonging the dwell time of the largest particles, which take longest to fire. But in addition it is thus possible to bring about the increase in temperature in the chamber by means of solid fuels having a low calorific power and/or a low content of volatile matter. It is in fact necessary that these fuels remain in the mixing chamber for a time sufficient to use up the amount of heat which they are capable of supplying. Hence the recycling of matter which is produced inside the chamber is favorable to the employment of such fuels.

Now, it has been established that it is possible to increase further the dwell time of the solid matter in the chamber by adopting arrangements which enable the recycling in the lower portion 12 to be increased.

That is, by judicious utilization of the rates and the speeds of the vortex flow A and of the axial flow B, it has been established that, even if the lower inlet orifice 4 is moved still further away from the outlet volute 3, the penetration of the axial flow B into the vortex formed in the upper portion 11 can still be obtained.

Figure 3:
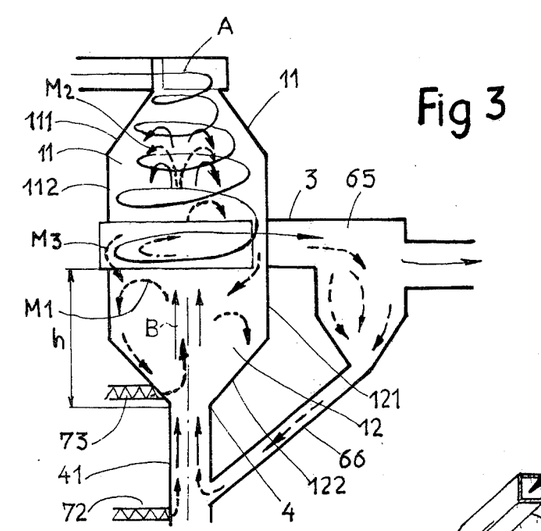
FIG. 3 is an elevation of another variant.

That is why, in the embodiment represented in FIG. 3, the size of the lower portion 12 has been increased, it being bounded by a cylindrical wall 121 of the same diameter as the wall 112 of the chamber 11 and prolonged downwards by a conical surface 122 which is connected to the inlet orifice 4 into which opens the duct 41 for introduction of the axial flow B.

The solid fuel is introduced into the duct 41 by a feed device 72 and the solid particles are carried along by the rising flow B.

In order to increase to the maximum the dwell time of the solid particles, the lower portion 12 has been given the maximum height h compatible with the maintenance of the suction of the axial flow B into the vortex formed by the flow A and leaving through the volute 3.

One portion M1 of the fuel, formed by the particles which are heaviest or are located on the periphery of the jet of the flow B where the speed is lowest, does not reach the upper portion 11, but descends again directly towards the orifice 4 where it is carried upwards again.

On the other hand another poriton M2 of the fuel reaches the vortex A and is mixed with it. Because of the centrifugal effect, the flow of gas does not carry along into the outlet volute 3 the whole of these particles, the heaviest (M3) descending again along the wall 121 into the chamber 12 where they are again caught up by the rising flow B.

Thus one and the same particle may remain a certain time in the mixing chamber before being carried away towards the outlet.

In order to increase the dwell time of the fuel in the mixing chamber still further, the installation may be improved in various ways.

Firstly, in order to distribute the solid particles better in the rising flow, a certain amount of fuel may also be introduced directly into the chamber 12 by a distribution member 73 located above the orifice 4.

The dwell time of the fuel may be further increased by making the outlet volute 3 emerge into a separator device 65 which may consist of a simple expansion chamber in which are deposited the coarsest portions of the matter exhausted through the outlet volute 3. This matter which collects in the bottom of the chamber 65 is discharged through a duct 66 which opens into the feedpipe 41 so as to reinject it into the gas flow B, such recycling enabling complete combustion to be obtained.

Such an arrangement may be employed especially when the bulk of the installation is not restricted.

Figure 4:
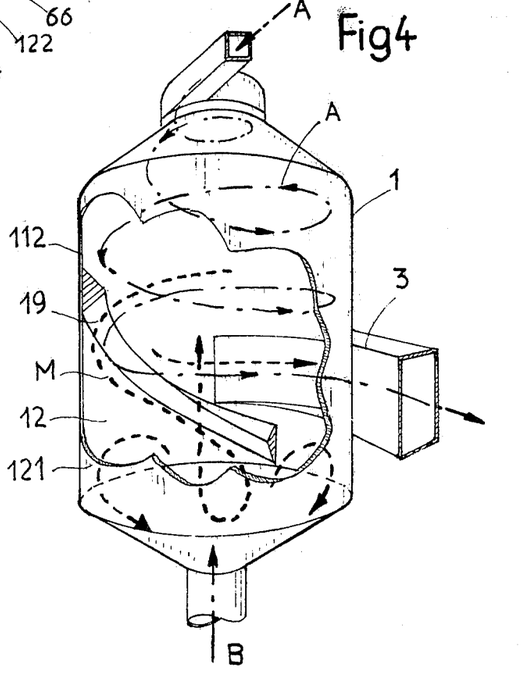
FIG. 4 is a perspective of a further improved embodiment.

One may also, as has been shown in the perspective of FIG. 4, place inside the chamber 1 a spiral rib 19 which extends along the cylindrical wall 121 and may be prolonged above the outlet volute 3 along the cylindrical wall 112.

This rib 19 which is wound in the direction of the vortex flow A and may have a slope of the order of 35° with respect to the generatrices of the cylinder 121, intercepts one portion M of the vortex flow escaping through the volute 3, and in particular the heaviest solid particles, which are thus directed towards the lower portion 12 in order to be recycled there into the rising flow B.

In cases where the mixing chamber 1 is to be employed at high temperatures, the rib 19 may be produced from a refractory material like the inner wall of the chamber 1.

Figure 5:
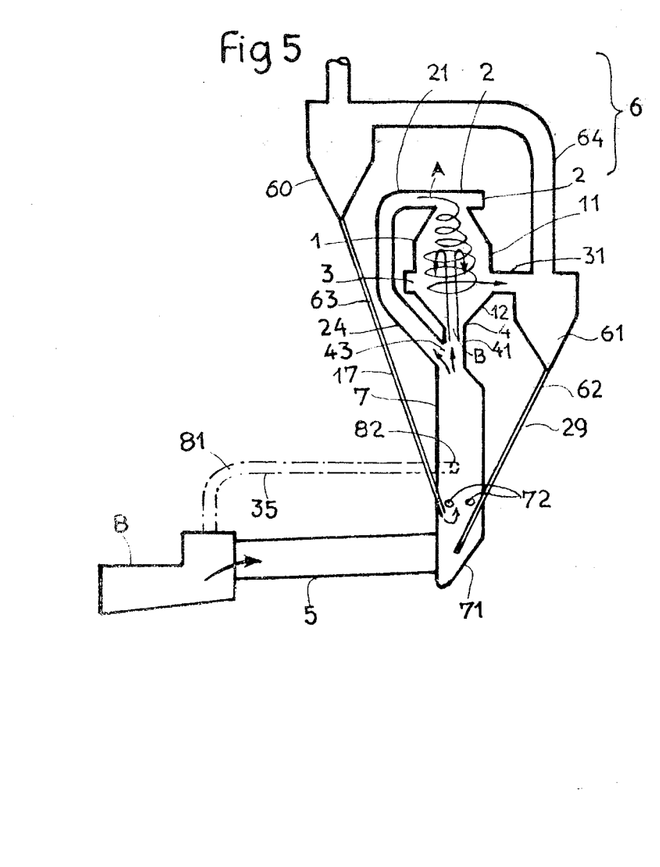
FIG. 5 is a partial diagrammatic view of an installation for production of cement, equipped with a mixing device in accordance with FIG. 1.
Figure 6:
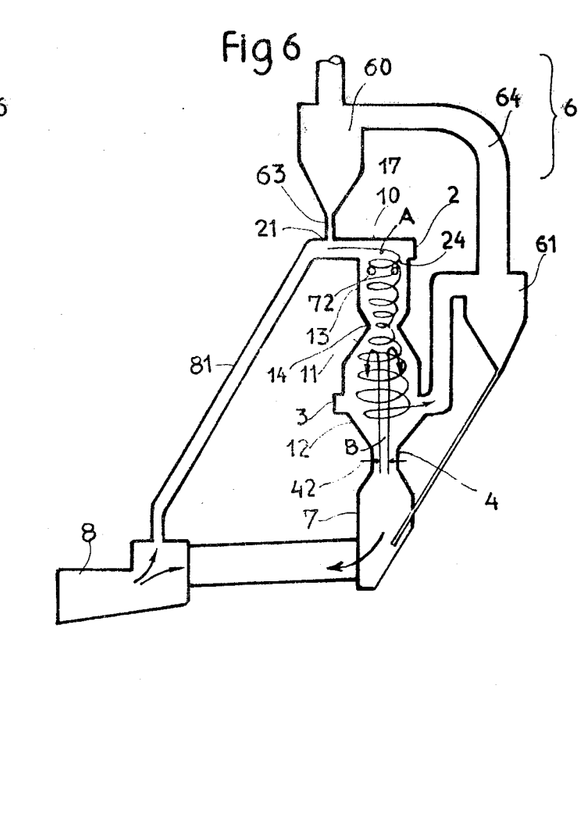
FIG. 6 is represents as a variant the application of the device as in FIG. 2 to an installation for firing cement.
Figure 7:
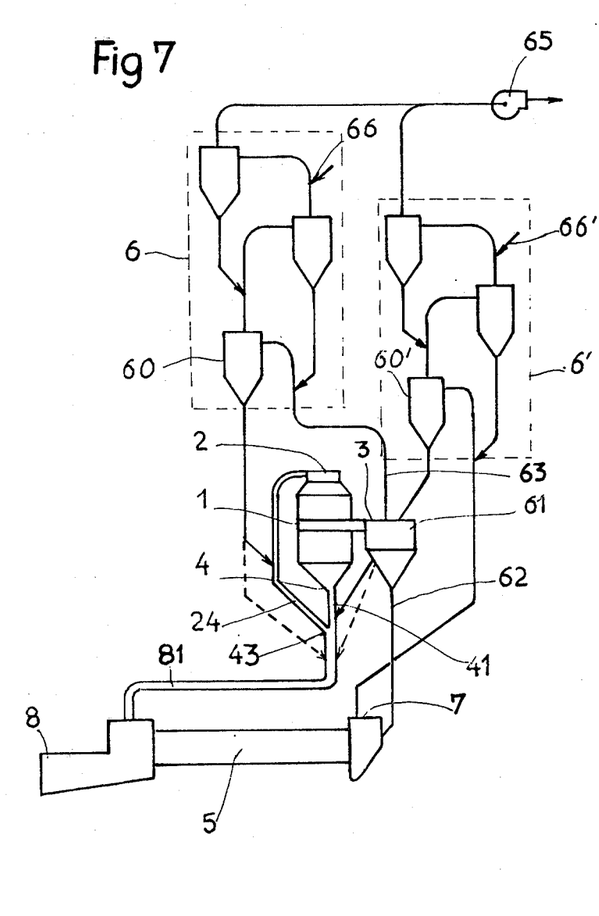
FIG. 7 represents another variant for application of the device to an installation for firing cement.

The mixing chamber, of which several embodiments of which have just been described, is particularly well adapted to installations for production of cement clinker. FIGS. 5, 6 and 7 represent diagrammatically a number of embodiments adapted to an installation for a cement factory, of the various variants of the mixing chamber in accordance with the invention.

One installation for the production of cement comprises essentially a slightly sloping rotary kiln 5, into the upper portion of which are introduced the raw materials previously reheated in a preheater installation 6 consisting, for example, of a succession of fixed cyclones of which only the last two have been represented in FIGS. 5 and 6. In a manner which is well known, the matter collected in the bottom of the last cyclone 61 is introduced through a duct 62 into the inlet to the rotary kiln 5, and more precisely onto a sloping surface 71 for connection of the upper end of the kiln to a vertical flue 7 through which the gases leaving the kiln are led towards the preheater, passing through the mixing and calcination chamber.

The matter introduced through the upper orifice of the kiln is treated inside the latter, and the clinker thus formed is discharged through the lower orifice towards a device for cooling by air 8.

In FIG. 5 the mixing the calcination chamber is of the type represented in FIG. 1. The outlet flue 7 is equipped in its lower portion with orifices 72 for injection of fuel at a height which is sufficient for enabling the development of a diffuse flame.

In this embodiment the mixing chamber 1 is fed solely from the outlet flue 7 from the kiln 5, the delivery from which is distributed between the vortex flow A and the axial flow B.

For this purpose the flue 7 is divided at its upper part into a bifurcation 43 consisting on one hand of the duct 41 opening into the lower orifice 4 of the mixing chamber and on the other hand of a diversion duct 24 connected by the duct 21 to the upper inlet volute 2 of the chamber.

Thus the lower axial flow B and the upper vortex flow A consist of two portions of the gas exhausted from the kiln through the vertical flue 7. The respective rates of the two gas flows may be regulated by a judicious choice of the areas of the ducts 41 and 24. A throttle valve (not shown) may be mounted upon the duct 41 and possibly upon the duct 24 to enable the respective rates to be regulated.

The matter reheated in the preheater installation is collected at the bottom of the last but one cyclone 60 and introduced through a duct 63 into the lower portion of the vertical flue 7, so that it may be carried along by the rising flow of gas leaving the kiln. Preferably this introduction of matter will take place below the fuel injection means 72.

It may be seen that, in the embodiment shown, the solid matter is contained in suspension in the two gas flows A and B introduced into the mixing chamber.

If the gases leaving the kiln 5 contain excess air, the combustion may be produced in the flue 7.

However, the gas for supporting combustion may likewise consist of the hot air coming from the cooler 8, where it is reheated in contact with the clinker leaving the kiln. In this case this hot air is led off by a duct 81 which opens through an orifice 82 into the bottom of the vertical flue 7 above the fuel injection orifices 72.

Thus there is developed in the flue 7 a diffuse combustion which causes the increase in the temperature of the flour introduced through the duct 63 and the calcination of which is terminated in the mixing chamber 1. Thanks to the recovery of the solid particles, carried out by the lower portion 12, all of the matter which has undergone this precalcination is finally discharged through the outlet volute 3 connected through a duct 31 to the last cyclone 61 which carries out the separation of the flour which is sent to the kiln through the duct 62, and the gases rising again towards the preheater and especially towards the last but one cyclone 6 through the flue 64.

The mode of installation which has just been described is especially useful for increasing production in older installations in which the calcination was previously carried out in the kiln. It will be observed in particular that the arrangement of the mixing chamber and its compact shape enable it to be particularly well adapted to the end of a vertical exhaust flue for the gases from the kiln upstream of the last cyclone.

In the embodiment shown in FIG. 6, the vertical flue 7 for exhaust of the gases from the kiln is shorter. That is, in this case the combustion is not produced in the flue 7 but in the upper section 13 of the mixing chamber which is of the type represented in FIG. 2.

In this case the upper portion of the vertical flue 7 opens directly into the lower inlet orifice 4 of the mixing chamber, this orifice being equipped with a throttle valve 42 which permits regulation of the area of the jet of the rising flow B, and consequently its speed of penetration into the interior of the mixing chamber 1.

The flow B therefore contains only the matter which has been carried along by the gases leaving the kiln. That is, the preheated raw flour coming from the last but one cyclone 60 is poured directly into the duct 21 for feeding inlet volute 2. In the duct 21 there also arrives the hot air coming from the cooler 8 and led off by the duct 81 which in this case is connected to the duct 21. In this way, if the burners 72 are placed in the upper portion of the section 13 a little below the inlet volute 2, a combustion is developed in the vortex of the flow A in the chamber 13 in the presence of the flour introduced through the duct 63 coming from the cyclone 60.

The calcination of this flour started in the upper portion 13 is continued and terminated in the lower portion 11 of the chamber thanks to the application of heat and to the intense stirring created by the jet of the flue gases B coming from the rotary kiln 5 and introduced into the bottom of the chamber through the inlet 4.

The gases and the calcined flour are extracted from the chamber through the outlet volute 3 connected to the inlet to the cyclone 61 through the duct 31.

In certain cases it may be necessary to divert some or all of the hot gases proceeding from the kiln 5 because of their high content of compounds harmful to the operation of the installation (concretion, high concentration of impurities in the finished product, etc). In such cases, the delivery of gas feeding the two inlets to the mixing chamber must come wholly or substantially from the cooler 8. The embodiment shown in FIG. 5 would then be used the outlet duct 81 of the gases from the cooler being connected upstream of the bifurcation 43 for feeding simultaneously the inlet duct 41 for the axial flow B and, through the diversion duct 24 the inlet duct 21 for the vortex flow A.

The gases leaving the kiln are diverted towards a purification device, a portion of them being mixable with the air coming from the cooler when satisfactory development of the method does not demand a total bypass.

Another adaptation of the mixing chamber is shown in FIG. 7. In this case, in accordance with an arrangement known per se, two suspension preheaters 6 and 6' are employed which may be equipped with separate fans, or may be connected in parallel to a common fan 65.

As has just been described, the precalcination chamber 1 is fed by the gases coming from the cooler 8 by way of the duct 81 which feeds the lower inlet 4 through the duct 41 and the upper inlet 2 through the diversion duct 24.

The outlet volute 3 opens into the cyclone 61 which separates the matter from the gases, the matter being directed to the inlet to the kiln 5 and the gases being drawn through the cyclone preheater 6.

On the other hand the gases coming from the kiln and being collected in the outlet flue 7 are drawn by the same fan 65 by way of the cyclone preheater 6'.

The raw material is introduced into the upper portion of each of the two preheaters, at 66 into the preheater 6 and at 66' into the preheater 6'. The matter descends from cyclone to cyclone while being reheated in contact with the hot gases being drawn by the fan 65, and the matter thus preheated and leaving the last cyclones 60 of the preheater 6 and 60' of the preheater 6' is introduced upstream of the precalcination chamber 1.

This introduction of the matter may be effected upstream of the bifurcation 43, the delivery of matter being then distributed substantially in the same ratio as the gases, between the two inlets 2 and 4 to the precalcination chamber.

However, the matter coming from the preheaters 6 and 6' may also be introduced separately into the duct 41 which feeds the axial flow B through the lower inlet 4 and into the duct 24 which feeds the vortex flow A through the upper inlet 2. Furthermore the respective capacities of the preheaters 6 and 6' and the deliveries of matter to the inlets 66 and 66' will obviously be chosen as a function of the temperatures and deliveries of the gases drawn through the kiln 5 and the cooler 8.

Of course other combinations are possible. Far example, the preheated matter leaving the cyclone 60' may to be introduced into the outlet flue of the gases from the cyclone 61 in order to be mixed there with the matter coming from the preheater 6, the outlet of matter from the cyclone 60 then constituting a sole feed to the precalcination chamber.

The tests which have been carried out have shown that the mixing chamber which has just been described, when installed between the rotary kiln and the cyclone exchanger, permits those thermal exchanges to be carried out and terminated in a restricted space and in a very effective manner, which are necessary to the calcination of the flour proceeding from the exchanger. In particular, by placing the mixing chamber directly at the mouth of the vertical outlet flue 7 of the gases from the kiln, the thermal energy of the flue gases is employed under the best conditions.

The high level of turbulence attained in the chamber enables the thermal exchanges of calcination to be terminated before the calcined matter contained in the flue gases being exhausted through the outlet volute is separated from them by the lower cyclone of the exchanger located downstream of the chamber. The smallness of the amounts of carbon-dioxide remaining to be liberated from the calcined flour introduced into the rotary kiln guarantees an excellent stability of flow of the flour through the kiln.

We claim:

1. A device for mixing by turbulence gaseous fluids and solid particles in suspension, comprising
   (a) a mixing chamber (1) bounded laterally by a wall of revolution about a vertical axis and into which emerge two flows of gaseous fluids at least one of which contains said particles in suspension;
   (b) a first inlet (2) located at the upper end of said chamber (1) for introducing a first flow (A) forming a vortex in said chamber;
   (c) an outlet volute (3) through which said first flow is exhausted;
   (d) a second inlet (4) located at the lower end and on the axis of said chamber (1) for introducing a second axial flow (B), the latter forming a jet which is sucked inside said vortex in order to mix there with said first flow, the whole being exhausted through said outlet volute (3);
   (e) said outlet volute (3) being located in the central portion of said chamber (1);
   (f) said chamber comprising an upper portion (11) for the formation of said vortex and said outlet volute, and a lower portion (12) which widens upwards between said second inlet (4)
   and said outlet volute (3), for the recovery and recycling into said axial flow (b) of solid particles which escape from said vortex.

2. A mixing device according to claim 1, wherein said solid particles are placed in suspension in said axial flow (B) introduced through the lower end (4) of said chamber.

3. A mixing device according to claim 1, wherein said axial flow (B) is fed through a duct (41) which opens into said second inlet and is equipped with a valve (42) for regulation of the rate of axial flow.

4. A mixing device according to any one of claims 1 to 3, wherein said vortex flow (A) is diverted from the delivery of said axial flow (B) by a diversion pipe (24) which is connected by a bifurcation (43) to the duct (41) carrying said axial flow (B) and opens into said first inlet (2) into said chamber (1).

5. A mixing device according to claim 1, wherein said upper portion of said chamber comprises an upper section (13) forming a combustion chamber at the upper end of which are located said first inlet (2) and fuel injection means (72) and a lower section (11) in the form of a surface which diverges downwardly as far as said outlet volute to form said mixing chamber, said upper and lower sections (13, 11) being connected by a passage (14) of smaller diameter.

6. A mixing device according to claim 1, wherein the height of said lower portion (12) between said outlet volute (3) and said second inlet (4) is limited to the maximum value compatible with the maintenance of the suction of said axial flow (B) into the vortex formed by said vortex flow (A).

7. A mixing device according to claim 1, wherein said lower poriton (12) is bounded by a cylindrical wall (121) having a diameter substantially equal to that of said outlet volute (3), extended downwardly by a conical wall (122) connected to said second inlet (4).

8. An installation for the manufacture of cement, comprising a precalcination chamber interposed between a device (6) for preheating raw material in suspension and a kiln (5) for clinkerization, said precalcination chamber comprising a mixing chamber (1) as claimed in claim 1, and (g) said preheated raw material coming from said preheater (6) being introduced into at least one of said gas flows (A) and (B) which consist of the hot gases proceeding toward said preheater (6);

(h) said outlet volute (3) emerging into a separation device (61) which comprises an outlet (62) for the matter toward said kiln (5) for clinkerization and a further outlet (63) for the gases moving toward said preheater (6).

9. An installation according to claim 8, comprising a device (8) for cooling material leaving said kiln (5), said vortex flow (A) comprising at least part of the gas coming from said cooling device (8), said axial flow (B) comprising at least part of the gases leaving said kiln (5).

10. An installation according to claim 9, wherein said vortex flow (A) and said axial flow (B) consist of the gases coming from said cooling device (8) fed through a flue which opens out upstream of a bifurcation (43) into a duct (41) for admission of said axial flow (B) and a diversion (21) for admission of said vortex flow (A).

11. An installation according to claim 8, comprising a vertical outlet flue (7) for the flue gases from said kiln, the lower portion of said outlet flue (7) having fuel injection means (72) and means of introduction of matter into the rising flow of gas, and the upper portion of said outlet flue (7) having a bifurcation (43) which opens out on the one hand into said second inlet (4), the latter being equipped with a regulator valve (42), and on the other hand into a diversion duct (24) which opens out into said first inlet (2) to said chamber.

12. An installation according to claim 9, wherein said vertical outlet flue (7) is equipped with means (81-82) of introduction of hot air downstream of the fuel injection, the said means of introduction being fed with hot air from said cooling device (9).

13. An installation according to claim 9, comprising a combustion chamber (13) placed above said mixing chamber (1), and comprising fuel injection means (72) at the upper portion of said combustion chamber (13), said first inlet being supplied through a duct (81) for recycling hot air proceeding from said cooling device (8) after firing, the material coming from said preheater (6) being introduced into said duct (81) and being carried along by the hot air toward said combustion chamber (13).

14. An installation according to claim 9, wherein said mixing chamber (1) is fed by the gases leaving said cooling device 88) and is connected by way of the separator (61) to a first preheater device (6) fed with raw material, the gases leaving said kiln (5) being directed toward a second preheater device (6') equipped with a separate feed of raw material and with an outlet duct for the preheated matter, which outlet opens out upstream of said mixing chamber (1).

15. An installation according to claim 14, wherein the duct (21) for admission of said vortex flow (A) and the duct (41) for admission of said axial flow (B) receive, the one the matter leaving the preheater (6) fed by the gases leaving said cooling device (8) and the other the matter leaving the preheater (6') fed by the gases leaving said kiln (5).

16. An installation according to claim 8, comprising fuel injection means (73) which open into the lower, recycling portion (12) of said mixing chamber (1).

* * * * *